US012132270B2

(12) United States Patent
Zhang et al.

(10) Patent No.: US 12,132,270 B2
(45) Date of Patent: Oct. 29, 2024

(54) ANTENNA STRUCTURE

(71) Applicant: Wistron NeWeb Corp., Hsinchu (TW)

(72) Inventors: Cheng-Rui Zhang, Hsinchu (TW); Yu-Sheng Fan, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 159 days.

(21) Appl. No.: 18/055,134

(22) Filed: Nov. 14, 2022

(65) Prior Publication Data

US 2023/0231310 A1 Jul. 20, 2023

(30) Foreign Application Priority Data

Jan. 20, 2022 (TW) ................................. 111102333

(51) Int. Cl.

| | |
|---|---|
| ***H01Q 9/04*** | (2006.01) |
| ***H01Q 1/48*** | (2006.01) |
| ***H01Q 1/52*** | (2006.01) |
| ***H01Q 5/307*** | (2015.01) |

(52) U.S. Cl.

CPC ............. *H01Q 9/0421* (2013.01); *H01Q 1/48* (2013.01); *H01Q 1/52* (2013.01); *H01Q 5/307* (2015.01); *H01Q 9/045* (2013.01)

(58) Field of Classification Search

CPC ........ H01Q 1/243; H01Q 1/2266; H01Q 1/52; H01Q 1/48; H01Q 13/10; H01Q 5/35; H01Q 5/371; H01Q 9/06; H01Q 9/42; H01Q 1/38; H01Q 1/50; H01Q 5/20; H01Q 5/307; H01Q 5/328; H01Q 5/378; H01Q 7/00; H01Q 9/0421; H01Q 9/045

See application file for complete search history.

(56) References Cited

U.S. PATENT DOCUMENTS

| | | | | |
|---|---|---|---|---|
| 6,844,853 | B2 | 1/2005 | Tai et al. | |
| 8,738,103 | B2 * | 5/2014 | Puente Baliarda ...... | H01Q 1/36 455/575.7 |
| 9,484,631 | B1 * | 11/2016 | Napoles ................. | H01Q 5/378 |
| 9,806,411 | B2 | 10/2017 | Hwang et al. | |
| 11,239,560 | B2 * | 2/2022 | Alfaro ...................... | H01Q 5/50 |
| 11,404,790 | B2 * | 8/2022 | Sun ........................ | H01Q 1/243 |
| 11,462,815 | B2 * | 10/2022 | Wu ........................ | H01Q 21/28 |

(Continued)

FOREIGN PATENT DOCUMENTS

| | | |
|---|---|---|
| TW | I268009 B | 12/2006 |
| TW | M478254 U | 5/2014 |
| TW | I552437 B | 10/2016 |

*Primary Examiner* — Monica C King
(74) *Attorney, Agent, or Firm* — McClure, Qualey & Rodack, LLP

(57) ABSTRACT

An antenna structure includes a ground element, a feeding radiation element, a shorting radiation element, a connection radiation element, a first radiation element, and a second radiation element. The feeding radiation element has a feeding point. The feeding radiation element is coupled through the shorting radiation element to the ground element. The connection radiation element is coupled between the first radiation element and the shorting radiation element. The second radiation element is coupled to the feeding radiation element. A coupling slot region is formed and substantially surrounded by the feeding radiation element, the shorting radiation element, the connection radiation element, the first radiation element, and the second radiation element.

18 Claims, 3 Drawing Sheets

100

(56) References Cited

U.S. PATENT DOCUMENTS

| | | | | |
|---|---|---|---|---|
| 2008/0018543 | A1* | 1/2008 | Baliarda | H01Q 5/371<br>343/702 |
| 2015/0180117 | A1 | 6/2015 | Ruan | |
| 2018/0048076 | A1* | 2/2018 | Wei | H01Q 21/30 |
| 2021/0273340 | A1* | 9/2021 | Sun | H01Q 5/10 |
| 2023/0032019 | A1* | 2/2023 | Peng | H01Q 21/08 |
| 2023/0231310 | A1* | 7/2023 | Zhang | H01Q 9/045<br>343/848 |
| 2024/0136702 | A1* | 4/2024 | Hou | H01Q 1/243 |

* cited by examiner

ANTENNA STRUCTURE

CROSS REFERENCE TO RELATED APPLICATIONS

This application claims priority of Taiwan Patent Application No. 111102333 filed on Jan. 20, 2022, the entirety of which is incorporated by reference herein.

BACKGROUND OF THE INVENTION

Field of the Invention

The disclosure generally relates to an antenna structure, and more particularly, it relates to an antenna structure for reducing the SAR (Specific Absorption Rate).

Description of the Related Art

With the advancements being made in mobile communication technology, mobile devices such as portable computers, mobile phones, multimedia players, and other hybrid functional portable electronic devices have become more common. To satisfy user demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi and Bluetooth systems and using frequency bands of 2.4 GHz, 5.2 GHz, and 5.8 GHz.

An antenna is an indispensable component in a mobile device that supports wireless communication. However, the antenna is easily affected by adjacent conductive components, which often interfere with the antenna and degrade the overall communication quality. Alternatively, the SAR (Specific Absorption Rate) may be too high to comply with regulations and laws. Accordingly, there is a need to propose a novel solution for solving the problems of the prior art.

BRIEF SUMMARY OF THE INVENTION

In an exemplary embodiment, the disclosure is directed to an antenna structure that includes a ground element, a feeding radiation element, a shorting radiation element, a connection radiation element, a first radiation element, and a second radiation element. The feeding radiation element has a feeding point. The feeding radiation element is coupled through the shorting radiation element to the ground element. The connection radiation element is coupled between the first radiation element and the shorting radiation element. The second radiation element is coupled to the feeding radiation element. A coupling slot region is formed and substantially surrounded by the feeding radiation element, the shorting radiation element, the connection radiation element, the first radiation element, and the second radiation element.

In some embodiments, the antenna structure covers a first frequency band, a second frequency band, and a third frequency band.

In some embodiments, the coupling slot region is configured to reduce the SAR (Specific Absorption Rate) of the antenna structure operating in the first frequency band, the second frequency band, and the third frequency band.

In some embodiments, the first frequency band is from 2400 MHz to 2500 MHz, the second frequency band is from 5150 MHz to 5850 MHz, and the third frequency band is from 5875 MHz to 7125 MHz.

In some embodiments, the ground element further includes a protruding branch.

In some embodiments, the shorting radiation element includes a grounding branch coupled to the ground element.

In some embodiments, the connection radiation element further includes an extension branch.

In some embodiments, the extension branch substantially has a triangular shape.

In some embodiments, the second radiation element substantially has a variable-width straight-line shape.

In some embodiments, the second radiation element includes a wide portion and a narrow portion, and the narrow portion is coupled through the wide portion to the feeding radiation element.

In some embodiments, the second radiation element and the first radiation element substantially extend in the same direction.

In some embodiments, the total length of the feeding radiation element, the shorting radiation element, the connection radiation element, and the first radiation element is substantially equal to 0.25 wavelength of the first frequency band.

In some embodiments, the total length of the feeding radiation element, the shorting radiation element, and the connection radiation element is substantially equal to 0.25 wavelength of the second frequency band.

In some embodiments, the total length of the feeding radiation element and the second radiation element is substantially equal to 0.25 wavelength of the third frequency band.

In some embodiments, the ratio of the shorting radiation element's width to the first radiation element's width is from 0.5 to 1.5.

In some embodiments, the width of the coupling slot region is from 0.15 mm to 3.5 mm.

In some embodiments, a first current flows through the first radiation element, and a second current flows through the shorting radiation element. The second current and the first current are substantially in opposite directions.

In some embodiments, the antenna structure further includes a dielectric substrate.

The feeding radiation element, the shorting radiation element, the connection radiation element, the first radiation element, and the second radiation element are disposed on the dielectric substrate.

In some embodiments, the dielectric substrate is an FPC (Flexible Printed Circuit) or a PCB (Printed Circuit Board).

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
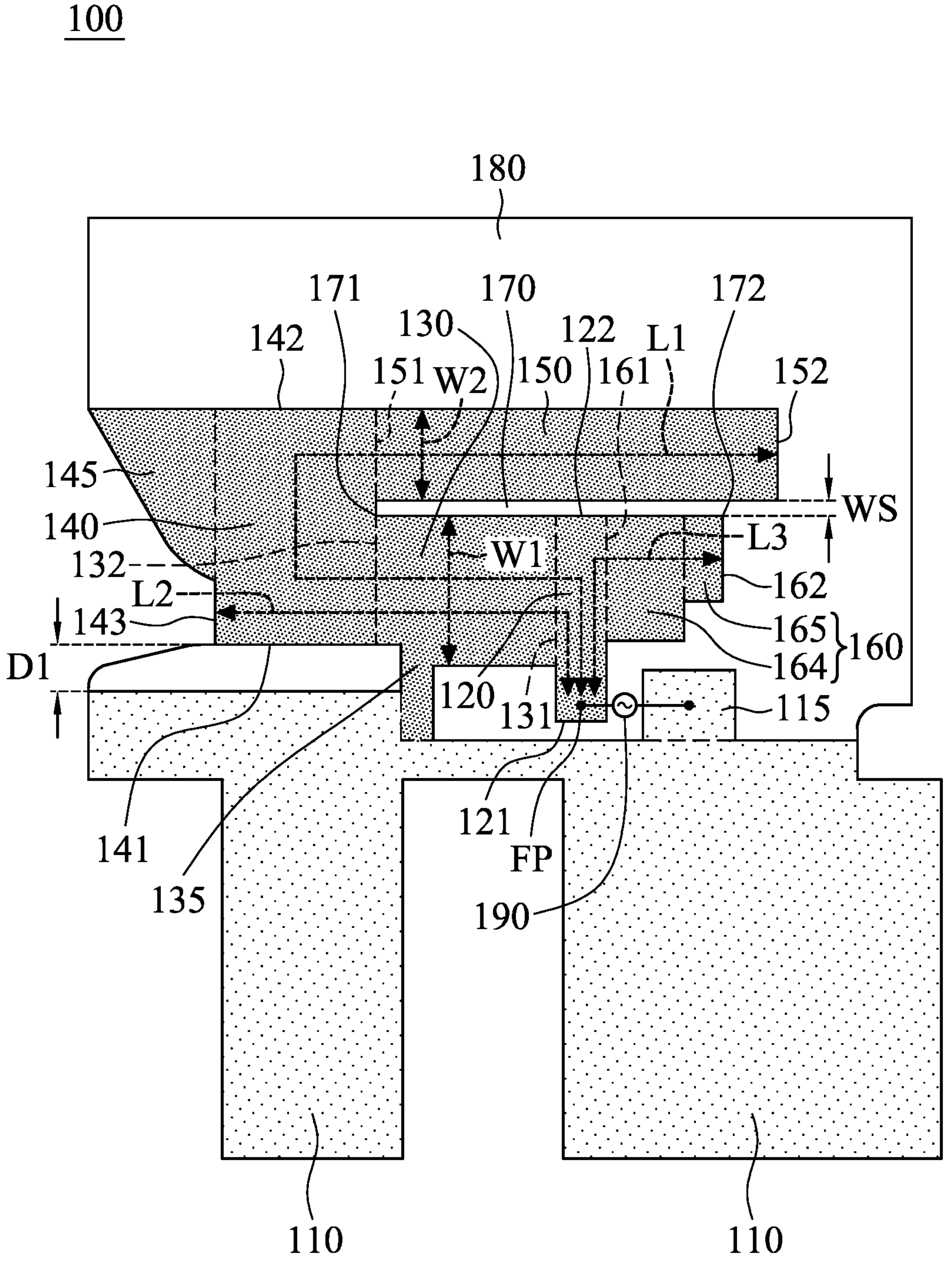
FIG. 1 is a top view of an antenna structure according to an embodiment of the invention.

In order to illustrate the purposes, features and advantages of the invention, the embodiments and figures of the invention are shown in detail below.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to other elements or features as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a top view of an antenna structure 100 according to an embodiment of the invention. The antenna structure 100 may be applied to a mobile device, such as a smart phone, a tablet computer, or a notebook computer. In the embodiment of FIG. 1, the antenna structure 100 at least includes a ground element 110, a feeding radiation element 120, a shorting radiation element 130, a connection radiation element 140, a first radiation element 150, and a second radiation element 160. The ground element 110, the feeding radiation element 120, the shorting radiation element 130, the connection radiation element 140, the first radiation element 150, and the second radiation element 160 may all be made of metal materials, such as copper, silver, aluminum, iron, or their alloys.

The ground element 110 may be a system ground plane, which is configured to provide a ground voltage. The shape of the ground element 110 is not limited in the invention. In some embodiments, the ground element 110 further includes a protruding branch 115, which may substantially have a rectangular shape.

The feeding radiation element 120 may substantially have a straight-line shape. Specifically, the feeding radiation element 120 has a first end 121 and a second end 122. A feeding point FP is positioned at the first end 121 of the feeding radiation element 120. The feeding point FP may be further coupled to a positive electrode of a signal source 190. For example, the signal source 190 may be an RF (Radio Frequency) module for exciting the antenna structure 100. In addition, a negative electrode of the signal source 190 may be coupled to the protruding branch 115 of the ground element 110. In some embodiments, the signal source 190 is further coupled through a coaxial cable to the feeding radiation element 120. A central conductive line of the coaxial cable is coupled to the feeding point FP. A conductive housing of the coaxial cable is coupled to the protruding branch 115.

The shorting radiation element 130 may substantially have an irregular shape. Specifically, the shorting radiation element 130 has a first end 131 and a second end 132. The first end 131 of the shorting radiation element 130 is coupled to the second end 122 of the feeding radiation element 120. In some embodiments, the shorting radiation element 130 includes a grounding branch 135 coupled to the ground element 110. The grounding branch 135 is adjacent to the second end 132 of the shorting radiation element 130. It should be noted that the term "adjacent" or "close" over the disclosure means that the distance (or the space) between two corresponding elements is shorter than a predetermined distance (e.g., 10 mm or shorter), or means that the two corresponding elements directly touch each other (i.e., the aforementioned distance, or the space between them, is reduced to 0). Thus, the feeding radiation element 120 is coupled through the shorting radiation element 130 to the ground element 110.

The connection radiation element 140 may substantially have a rectangular shape. Specifically, the connection radiation element 140 has a first end 141 and a second end 142. The first end 141 of the connection radiation element 140 is coupled to the second end 132 of the shorting radiation element 130. In some embodiments, the connection radiation element 140 further includes an extension branch 145, which may substantially have a triangular shape.

The first radiation element 150 may substantially have an equal-width straight-line shape. Specifically, the first radiation element 150 has a first end 151 and a second end 152. The first end 151 of the first radiation element 150 is coupled to the second end 142 of the connection radiation element 140. The second end 152 of the first radiation element 150 is an open end. Thus, the connection radiation element 140 is coupled between the first radiation element 150 and the shorting radiation element 130. In some embodiments, adjustments are made so that the first radiation element 150 has a variable-width straight-line shape.

The second radiation element 160 may substantially have a variable-width straight-line shape. Specifically, the second radiation element 160 has a first end 161 and a second end 162. The first end 161 of the second radiation element 160 is coupled to the second end 122 of the feeding radiation element 120. The second end 162 of the second radiation element 160 is an open end. For example, the second end 162 of the second radiation element 160 and the second end 152 of the first radiation element 150 may substantially extend in the same direction. In some embodiments, the second radiation element 160 includes a wide portion 164 adjacent to the first end 161 and a narrow portion 165 adjacent to the second end 162. The narrow portion 165 is coupled through the wide portion 164 to the feeding radiation element 120.

A coupling slot region 170 is formed and substantially surrounded by the feeding radiation element 120, the shorting radiation element 130, the connection radiation element 140, the first radiation element 150, and the second radiation element 160. For example, the coupling slot region 170 may be a straight-line slot with a closed end 171 and an open end 172.

In some embodiments, the antenna structure 100 further includes a dielectric substrate 180. The ground element 110, the feeding radiation element 120, the shorting radiation element 130, the connection radiation element 140, the first radiation element 150, and the second radiation element 160 may all be disposed on the same surface of the dielectric substrate 180. For example, the dielectric substrate 180 may be an FPC (Flexible Printed Circuit) or a PCB (Printed Circuit Board), but it is not limited thereto.

In some embodiments, the antenna structure 100 can cover a first frequency band, a second frequency band, and a third frequency band. For example, the first frequency band may be from 2400 MHz to 2500 MHz, the second frequency band may be from 5150 MHz to 5850 MHz, and the third frequency band may be from 5875 MHz to 7125 MHz. Therefore, the antenna structure 100 can support at least the wideband operations of the conventional WLAN (Wireless Local Area Network) 2.4 GHz/SGHz and the next-generation Wi-Fi 6E.

With respect to the operational principles, the feeding radiation element 120, the shorting radiation element 130, the connection radiation element 140, and the first radiation element 150 can be excited together to generate the aforementioned first frequency band. The feeding radiation element 120, the shorting radiation element 130, and the connection radiation element 140 can be excited together to generate the aforementioned second frequency band. The feeding radiation element 120 and the second radiation element 160 can be excited together to generate the aforementioned third frequency band. According to practical measurements, the extension branch 145 of the connection radiation element 140 can help to increase the effective resonant length. In addition, the protruding branch 115 of the ground element 110 is configured to reduce the whole manufacturing complexity.

Figure 2:
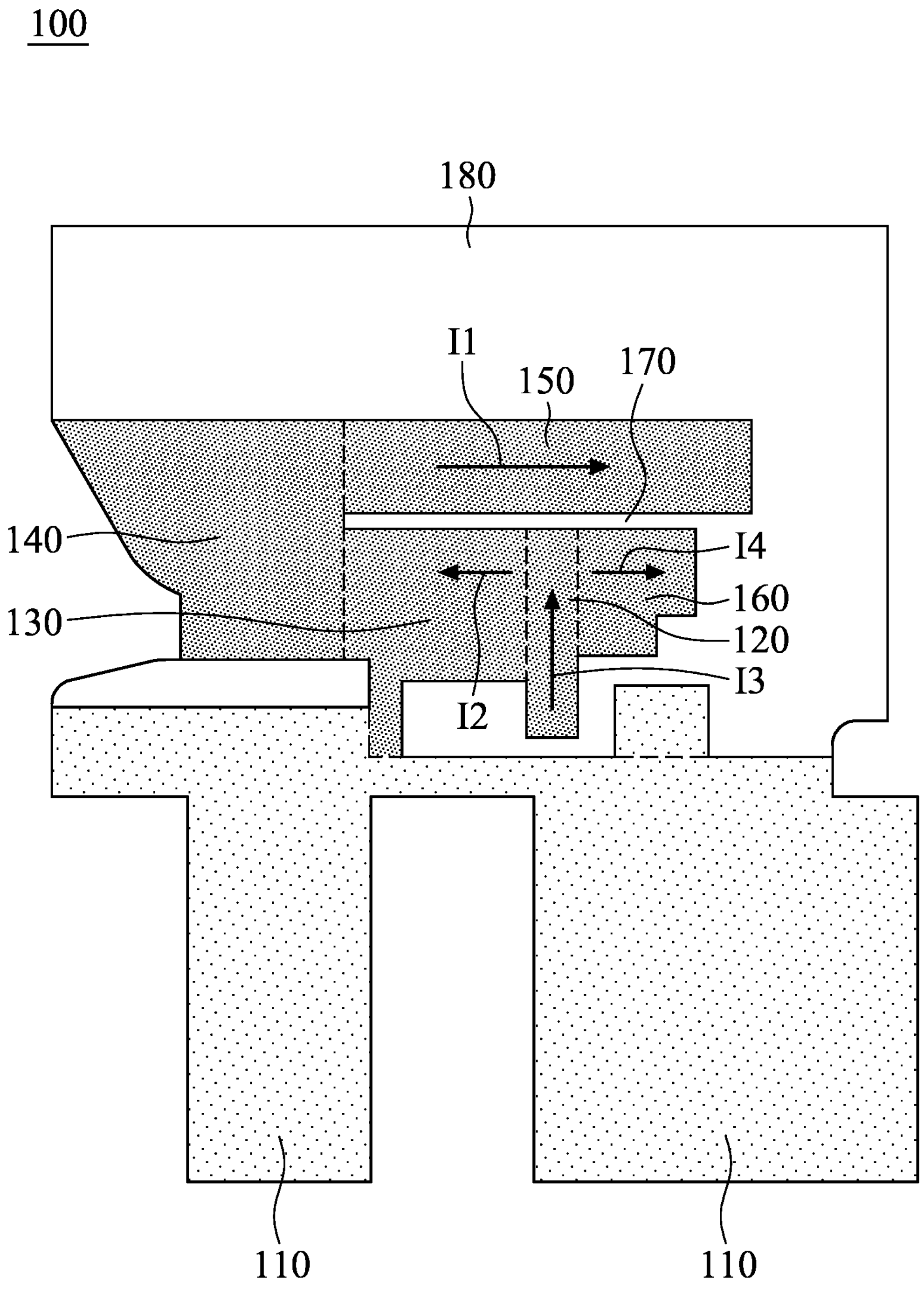
FIG. 2 is a diagram of current distribution of an antenna structure according to an embodiment of the invention.

FIG. 2 is a diagram of current distribution of the antenna structure 100 according to an embodiment of the invention. In the embodiment of FIG. 2, when the antenna structure 100 is excited by the signal source 190, a first current I1 flows through the first radiation element 150, and a second current I2 flows through the shorting radiation element 130. It should be understood that the second current I2 and the first current Il are substantially in opposite directions. In some embodiments, the second current I2 further flows through the connection radiation element 140 and then forms the first current I1. Also, a third current I3 is induced from the feeding radiation element 120. The second current I2 is formed by a portion of the third current I3. In addition, a fourth current I4 is formed by the other portion of the third current I3. The fourth current I4 flows to the second radiation element 160. That is, the fourth current I4 and the second current I2 are substantially in opposite directions. According to practical measurements, such a current-cancellation design relative to the coupling slot region 170 can help to reduce the SAR (Specific Absorption Rate) of the antenna structure 100 operating in the first frequency band, the second frequency band, and the third frequency band as mentioned above. It should bot noted that since the grounding branch 135 is positioned between the feeding point FP and the connection radiation element 140 and the feeding point FP is away from the connection radiation element 140, the effective resonant length of the antenna structure 100 can be increased, and the opposite design of the first current I1 and the second current I2 can be further enhanced.

In some embodiments, the element sizes of the antenna structure 100 will be described below. The total length L1 of the feeding radiation element 120, the shorting radiation element 130, the connection radiation element 140, and the first radiation element 150 (the total length L1 may begin from the feeding point FP and then extend to the second end 152 of the first radiation element 150) may be substantially equal to 0.25 wavelength (λ/4) of the first frequency band of the antenna structure 100. The total length L2 of the feeding radiation element 120, the shorting radiation element 130, and the connection radiation element 140 (the total length L2 may begin from the feeding point FP and then extend to a side 143 of the connection radiation element 140) may be substantially equal to 0.25 wavelength (λ/4) of the second frequency band of the antenna structure 100. The total length L3 of the feeding radiation element 120 and the second radiation element 160 (the total length L3 may begin from the feeding point FP and then extend to the second end 162 of the second radiation element 160) may be substantially equal to 0.25 wavelength (λ/4) of the third frequency band of the antenna structure 100. The shorting radiation element 130 has a width of W1, and the first radiation element 150 has a width of W2. The ratio (W1/W2) of the shorting radiation element 130's width W1 to the first radiation element 150's width W2 may be from 0.5 to 1.5. The width WS of the coupling slot region 170 may be from 0.15 mm to 3.5 mm. The distance D1 between the connection radiation element 140 and the ground element 110 may be from 1 mm to 3 mm. The above ranges of element sizes are calculated and obtained according to the results of many experiments, and they can help to optimize the SAR, the operational bandwidth, and the impedance matching of the antenna structure 100.

Figure 3:
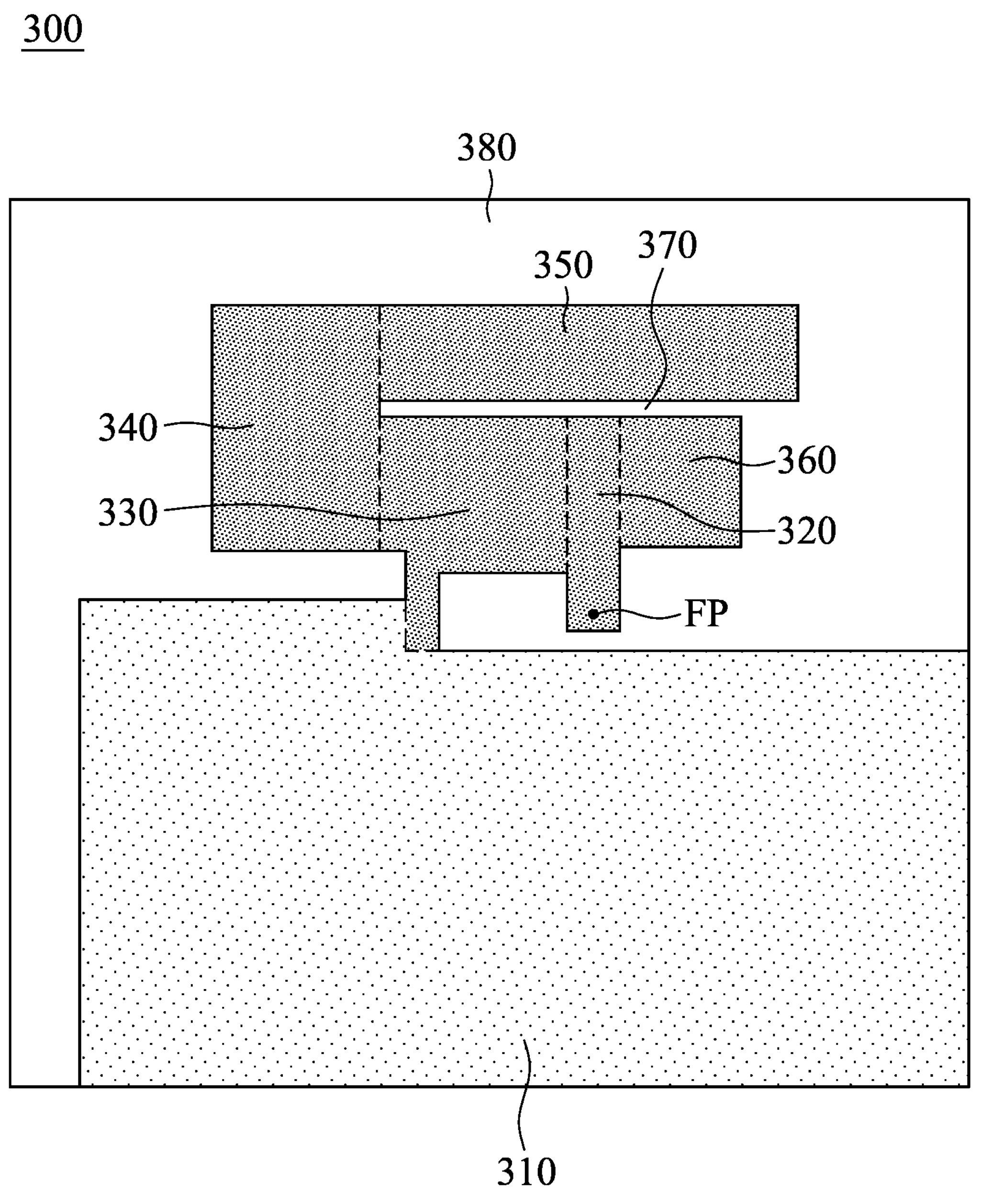
FIG. 3 is a top view of an antenna structure according to another embodiment of the invention.

FIG. 3 is a top view of an antenna structure 300 according to another embodiment of the invention. FIG. 3 is similar to FIG. 1. In the embodiment of FIG. 3, the antenna structure 300 includes a ground element 310, a feeding radiation element 320, a shorting radiation element 330, a connection radiation element 340, a first radiation element 350, a second radiation element 360, and a dielectric substrate 380. A coupling slot region 370 is formed in the antenna structure 300. It should be noted that the ground element 310 substantially has a completely rectangular shape (without any notch and without any protruding branch), the connection radiation element 340 does not include any extension branch, and the second radiation element 360 substantially has an equal-width straight-line shape. According to practical measurements, such a slight structural adjustment does not negatively affect the radiation performance of the antenna structure 300. Other features of the antenna structure 300 of FIG. 3 are similar to those of the antenna structure 100 of FIG. 1. Therefore, the two embodiments can achieve similar levels of performance.

The invention proposes a novel antenna structure. Compared to the conventional design, the invention has at least the advantages of low SAR, small size, wide bandwidth, and low manufacturing cost, and therefore it is suitable for application in a variety of mobile communication devices.

Note that the above element sizes, element shapes, and frequency ranges are not limitations of the invention. An antenna designer can fine-tune these settings or values according to different requirements. It should be understood that the antenna structure of the invention is not limited to the configurations of FIGS. 1-3. The invention may merely include any one or more features of any one or more embodiments of FIGS. 1-3. In other words, not all of the features displayed in the figures should be implemented in the antenna structure of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:
- a ground element;
- a feeding radiation element, having a feeding point;
- a shorting radiation element, wherein the feeding radiation element is coupled through the shorting radiation element to the ground element;
- a connection radiation element;
- a first radiation element, wherein the connection radiation element is coupled between the first radiation element and the shorting radiation element; and
- a second radiation element, coupled to the feeding radiation element;
- wherein a coupling slot region is formed and substantially surrounded by the feeding radiation element, the shorting radiation element, the connection radiation element, the first radiation element, and the second radiation element;
- wherein the second radiation element and the first radiation element substantially extend in a same direction.

2. The antenna structure as claimed in claim 1, wherein the antenna structure covers a first frequency band, a second frequency band, and a third frequency band.

3. The antenna structure as claimed in claim 2, wherein the coupling slot region is configured to reduce an SAR (Specific Absorption Rate) of the antenna structure operating in the first frequency band, the second frequency band, and the third frequency band.

4. The antenna structure as claimed in claim 2, wherein the first frequency band is from 2400 MHz to 2500 MHz, the second frequency band is from 5150 5850 MHZ, and the third frequency band is from 5875 MHz to 7125 MHz.

5. The antenna structure as claimed in claim 1, wherein the ground element further comprises a protruding branch.

6. The antenna structure as claimed in claim 1, wherein the shorting radiation element comprises a grounding branch coupled to the ground element.

7. The antenna structure as claimed in claim 1, wherein the connection radiation element further comprises an extension branch.

8. The antenna structure as claimed in claim 7, wherein the extension branch substantially has a triangular shape.

9. The antenna structure as claimed in claim 1, wherein the second radiation element substantially has a variable-width straight-line shape.

10. The antenna structure as claimed in claim 1, wherein the second radiation element comprises a wide portion and a narrow portion, and the narrow portion is coupled through the wide portion to the feeding radiation element.

11. The antenna structure as claimed in claim 2, wherein a total length of the feeding radiation element, the shorting radiation element, the connection radiation element, and the first radiation element is substantially equal to 0.25 wavelength of the first frequency band.

12. The antenna structure as claimed in claim 2, wherein a total length of the feeding radiation element, the shorting radiation element, and the connection radiation element is substantially equal to 0.25 wavelength of the second frequency band.

13. The antenna structure as claimed in claim 2, wherein a total length of the feeding radiation element and the second radiation element is substantially equal to 0.25 wavelength of the third frequency band.

14. The antenna structure as claimed in claim 1, wherein a ratio of the shorting radiation element's width to the first radiation element's width is from 0.5 to 1.5.

15. The antenna structure as claimed in claim 1, wherein a width of the coupling slot region is from 0.15 mm to 3.5 mm.

16. The antenna structure as claimed in claim 1, wherein a first current flows through the first radiation element, wherein a second current flows through the shorting radiation element, and wherein the second current and the first current are substantially in opposite directions.

17. The antenna structure as claimed in claim 1, further comprising:
- a dielectric substrate, wherein the feeding radiation element, the shorting radiation element, the connection radiation element, the first radiation element, and the second radiation element are disposed on the dielectric substrate.

18. The antenna structure as claimed in claim 17, wherein the dielectric substrate is an FPC (Flexible Printed Circuit) or a PCB (Printed Circuit Board).

* * * * *